US008229114B2

(12) United States Patent
Nan et al.

(10) Patent No.: US 8,229,114 B2
(45) Date of Patent: Jul. 24, 2012

(54) IDENTITY-BASED KEY GENERATING METHODS AND DEVICES

(75) Inventors: XiangHao Nan, Beijing (CN); Zhong Chen, Beijing (CN)

(73) Assignee: Beijing E-Henxen Authentication Technologies. Co., Ltd., Beijing (CN)

( * ) Notice: Subject to any disclaimer, the term of this patent is extended or adjusted under 35 U.S.C. 154(b) by 685 days.

(21) Appl. No.: 11/795,264

(22) PCT Filed: Jan. 13, 2006

(86) PCT No.: PCT/CN2006/000054
§ 371 (c)(1),
(2), (4) Date: Apr. 11, 2008

(87) PCT Pub. No.: WO2006/074611
PCT Pub. Date: Jul. 20, 2006

(65) Prior Publication Data
US 2008/0267394 A1 Oct. 30, 2008

(30) Foreign Application Priority Data

Jan. 14, 2005 (CN) .......................... 2005 1 0002156

(51) Int. Cl.
*H04L 9/28* (2006.01)

(52) U.S. Cl. .............. 380/44; 380/30; 380/45; 380/277; 713/155; 713/157; 713/171; 713/180

(58) Field of Classification Search .................. 713/155, 713/171, 157, 180; 380/30, 44–45, 277
See application file for complete search history.

(56) References Cited

U.S. PATENT DOCUMENTS

| | | | | |
|---|---|---|---|---|
| 6,986,044 | B1 * | 1/2006 | Inada ............................ | 713/170 |
| 7,113,594 | B2 * | 9/2006 | Boneh et al. ..................... | 380/28 |
| 7,239,701 | B1 * | 7/2007 | Ogishi et al. ..................... | 380/44 |
| 7,571,321 | B2 * | 8/2009 | Appenzeller et al. ......... | 713/171 |
| 2003/0081785 | A1 * | 5/2003 | Boneh et al. .................. | 380/277 |
| 2004/0151308 | A1 * | 8/2004 | Kacker et al. ................... | 380/30 |
| 2005/0010801 | A1 * | 1/2005 | Spies et al. ..................... | 713/200 |
| 2005/0084100 | A1 * | 4/2005 | Spies et al. ..................... | 380/30 |
| 2005/0117745 | A1 * | 6/2005 | Lee et al. ........................ | 380/30 |
| 2006/0126832 | A1 * | 6/2006 | Takahashi ........................ | 380/30 |
| 2008/0267394 | A1 * | 10/2008 | Nan et al. ........................ | 380/44 |
| 2011/0173452 | A1 * | 7/2011 | Nan et al. ........................ | 713/179 |

OTHER PUBLICATIONS

Hai-yan Wang; Ru-chuan Wang, CPK-based grid authentication: a step forward,The Journal of China Universities of Posts and Telecommunications, vol. 14, Issue 1, Mar. 2007, pp. 26-31.*

Page, D.; Vercauteren, F.; A Fault Attack on Pairing-Based Cryptography,Computers, IEEE Transactions on, Issue Date: Sep. 2006 vol. 55 Issue:9 on pp. 1075-1080.*

* cited by examiner

*Primary Examiner* — Taghi Arani
*Assistant Examiner* — Amir Mehrmanesh
(74) *Attorney, Agent, or Firm* — McDermott Will & Emery LLP

(57) ABSTRACT

The present invention discloses a method and device of generating asymmetrical key pair (public key and private key) based on user identity. Key Management Center (KMC) generates public/private key calculating base, and publish the public key calculating base. Based on identity provided by a user, a private key is calculated and provided to the user. Any user can calculate other user's public key based on other user's identity and the published public key calculating base. Thus, when obtaining the public key of the communicating party, no third party CA certificate is needed, and no maintenance of mass parameters associated with users are needed.

2 Claims, No Drawings

IDENTITY-BASED KEY GENERATING METHODS AND DEVICES

RELATED APPLICATIONS

This application is the U.S. National Phase under 35 U.S.C. §371 of International Application No. PCT/CN2006/000054, filed on Jan. 13, 2006, which in turn claims the benefit of Chinese Patent Application No. 2005-10002156.4, filed on Jan. 14, 2005, the disclosures of which Applications are incorporated by reference herein.

FIELD OF INVENTION

The invention relates to cyber security technology, in particular, relates to a method and device that generates public key/private key pair in an asymmetric key system.

BACKGROUND OF THE INVENTION

With development of internet, the requirement for computer and cyber security keeps increasing, and corresponding encryption algorithm and technology also develop rapidly. The current encryption technology can be divided into two categories, namely, symmetric key technology and asymmetric key technology. Asymmetric key technology has been widely used because it can avoid transferring decryption key (i.e., private key) via network.

Currently for people skilled in the art, the most well-known technology of asymmetric key is PKI (Public Key Infrastructure). Operation of PKI relies on two parts: hierarchical CA mechanism (Certificate Authority) and bulky certificate database LDAP. PKI depends on third-party authentication to solve the problem of ID and key binding. This requires building up a bulky hierarchical CA authentication mechanism. PKI also needs support from online operating certificate database, which initiates large network information flow volume, for example, in order to obtain a certificate from the other communication party, one needs to authenticate with CA hierarchically. Thus, scholars worldwide, including some PKI companies, are actively looking for a new solution.

Another promising encryption technology is IBE (Identity Based Encryption). In 1984, Shamir proposed identity-based signature idea, and speculated the existence of identity-based encryption (IBE). However, he failed to find out how to implement such idea.

In 2001, based on Shamir's idea, Don Boneh and Matthew Franklin proposed using Weil pairing to realize identity-based encryption. Comparing with PKI, although IBE algorithm discards bulky hierarchical CA mechanism, IBE still needs to keep parameters associated with users. Because the parameters relate to each user, the number of parameters quantity is proportional to the amount of users. As long as user related information needs to be published, it needs support from databases such as directory database (LDAP), and thus dynamic online maintenance cannot be reduced.

SUMMARY OF THE INVENTION

One object of the invention is to find out a simple, identity-based key generating method with no limitation to user numbers, in order to solve the above mentioned problems.

Thus, this invention provides a key generating and managing method, and corresponding device and system. By generating a public key from the other party's identity, no third party CA certificate is needed, and there is no online maintenance. According to the present invention, the identity-based key generating and managing method uses limited public key/private key pair to set up public key parameter and private key parameter respectively, and creates mapping algorithm and operation rules, so that each party can directly calculate other party's public key through other party's identify, and thus to obtain identity-based key.

The present invention discloses a method that generates asymmetric key pair based on user identity, including the following steps: Generating private key parameter and public key parameter corresponding to each other; based on the identity provided by first user, using the private key parameter to calculate the first user's private key; providing the generated private key to the first user; and making the public key parameter public, so that second user, upon obtaining the first user's identity, can use the public key parameter to calculate the first user's public key based on first user's identity.

In addition, the present invention discloses a device that generates asymmetric key pair based on user identity, including: one or more processor and memory, the processor generating private key parameter and public key parameter corresponding to each other, storing the private key parameter in the memory, calculating first user's private key based on the identity provided by it, providing the calculated private key to the first user, and making public key parameter public, so that second user can calculate the first user's public key based on published public key parameter and first user's identity.

The second user can calculate the first user's public key based on the published public key parameter and first user's identity.

The present invention can be realized through Elliptic Curve Cryptography, or Discrete Logarithm Cryptography.

Identity used here is a broad term, which may include user name, user's ID number, phone number, Email address, personal account, equipment serial number and software process name.

In one embodiment of the invention, private key parameter is a secret variable, specialized in generating private key, and stored in key management center (KMC). Public key parameter is a public variable, which is directly published on the most easily accessible media. Because the parameters to be published are rather limited, generally, they are recorded directly in personal ID authentication card, and sent to users with private key. Thus, as long as each party knows the other party's identity, he can calculate any user's public key by using public key parameter.

Comparing with prior art, this invention treats the other party's identity as the other party's public key, and thus no certificate from a third party organization is needed. In contrast to IBE algorithm, this invention only needs to save a few common parameters, instead of a vast number of user-related parameters. Thus, no support from database, such as directory database (LDAP) is needed, and there is no online maintenance.

The following table compares this invention with existing technologies, and the improvement over existing technologies.

| Major Technology | CA (Certificate Authority) | LDAP (database) | Online Maintenance | Process Check |
| --- | --- | --- | --- | --- |
| PKI | Third-party Authentication | Certificate Database | tremendous | N/A |
| IBE | Not required | Parameter Database | Large | N/A |
| This Invention | Not required | not required | None | Available |

DETAILED DESCRIPTION OF THE PREFERRED EMBODIMENT

In the following embodiments, public/private key generating method will be described by using elliptic curve cryptography as an example.

According to definition of elliptic curve cryptography (ECC) standard, suppose: elliptic curve (cryptography) E: $y^2=x^3+ax+b(m)$, Parameter T: (a,b,G,n,m), in which m is modulus, n is bounds, G is base point, i.e., $G=(X_0, Y_0)$. If choosing private key s as any integer, then the corresponding public key P obtained is a point sG on the elliptic curve E, marked as $(x_s, y_s)$.

(1) Public Key Calculating Base and Private Key Calculating Base:

Public/private key calculating base is the basis to achieve identity-based key algorithm. Private key calculating base SCB is composed of random integer variables $s_{ij}$; while public key calculating base PCB is derived from SCB under principle of ECC, i.e., $s_{ij}G=(x_{ij}, y_{ij})=P_{ij}$. One-to-one public/private key pair is formed between private key calculating base and public key calculating base. Suppose the size of the calculating base is defined as f×h, then private key calculating base (SCB) and public key calculating base (PCB) can be defined as follows:

$$SCB = \begin{matrix} S_{11} & S_{12} & S_{13} & \ldots & S_{1h} \\ S_{21} & S_{22} & S_{23} & \ldots & S_{2h} \\ S_{31} & S_{32} & S_{33} & \ldots & S_{3h} \\ \ldots & \ldots & \ldots & \ldots & \ldots \\ S_{f1} & S_{f2} & S_{f3} & \ldots & S_{fh} \end{matrix} \quad PCB = \begin{matrix} P_{11} & P_{12} & P_{13} & \ldots & P_{1h} \\ P_{21} & P_{22} & P_{23} & \ldots & P_{2h} \\ P_{31} & P_{32} & P_{33} & \ldots & P_{3h} \\ \ldots & \ldots & \ldots & \ldots & \ldots \\ P_{f1} & P_{f2} & P_{f3} & \ldots & P_{fh} \end{matrix}$$

Public/private key calculating base has the following natures.

Nature 1: There is one-to-one corresponding relationship between private key calculating base SCB and public key calculating base PCB. Suppose $S_{11}$ of SCB is a private key, then $P_{11}$ of PCB is a public key for $S_{11}$, because $P_{11}=(x_{11}, y_{11})=S_{11}G=S_{11}(X_0, Y_0)$. Same, suppose $S_{21}$ is a private key, then $P_{21}$ is the public key for $S_{21}$. Accordingly, suppose $S_{ij}$ is private key, then $P_{ij}$ is public key (i=1 . . . f, j=1 . . . h).

Nature 2: In Elliptic Curve Cryptography, if $S_{11}$ and $S_{21}$ are private keys, their corresponding public keys are $P_{11}$ and $P_{21}$. Accordingly, when $S_{11}+S_{21}=\alpha$ used as private key, $P_{11}+P_{21}=\beta$ is the public key for $\alpha$. This is because $\beta=P_{11}+P_{21}=(x_{11}, y_{11})+(X_{21}, Y_{21})=S_{11}G+S_{21}G=(S_{11}+S_{21})G=\alpha G$. This meets with the definition of ECC (Elliptic Curve Cryptography) public/private key.

It can be seen from Nature 1 that, building private key calculating base and public key calculating base is very simple. It can be seen from Nature 2 that, the invention provides a basis for obtaining keys on large scale by using one algorithm.

If one can connect such calculating base natures with user identity, then it will not be difficult to construct an identity-based key system.

In another embodiment, it uses Discrete Logarithm Cryptography, with parameter defined as T=(g, m), in which g is integer base smaller than m, and m is modulus. Suppose integer s is a private key, then public key is $g^s=p \mod m$, in which p is integer. Same as Elliptic Curve Cryptography, Discrete Logarithm Cryptography also leads to private key calculating base SCB and public key calculating base PCB, which is similar to the above ones of Elliptic Curve Cryptography.

(2) Row Mapping and Column Permutation

In order to perform identity-based key distribution, one needs to find a way to combine public/private key calculating base and user identity. There are several methods to bind public key with identity, however, the simplest one is random mapping.

In order to demonstrate, the following example uses a simple way of encryption (random), to bind identity and public key variable together. Thus, two algorithms need to be set up: row value algorithm and column value algorithm.

Row Value Algorithm:

Given row value key ROWKEY, which is an open variable, in the form of constant.

Firstly, under HASH algorithm (e.g., MD5), replace name identity (IDENTITY) that has undetermined length to a fixed length variable data1.

HASH (IDENTITY)=data1:

Under encryption algorithm (e.g., AES), use intermediate variable data1 as data; and use row value key ROWKEY to encrypt, to obtain intermediate variable $MAP_0$: use intermediate variable $MAP_0$ as data, and use key ROWKEY to encrypt again, to obtain intermediate variable $MAP_1$, and so on, until obtain the required number of MAP. For convenience, this example sets the size of calculating base as (32× 32). The key ROWKEY used is provided in ID certificate.

$AES_{ROWKEY}(data1)=MAP_0$:

$AES_{ROWKEY}(MAP_0)=MAP_1$;

The 16 bytes of MAPo obtain 16 row values that are less than m, by using modulus m (here m=32), respectively, and marked as map [0]-map [15]; the 16 bytes of MAP1 mod m respectively, to obtain 16 row values that are less than m, marked as map [16]-map [31].

$MAP_0[I] \mod m=map[i]$ (i=0, 1, . . . , 15);

$MAP_1[I] \mod m=map[i]$ (i=16, 17, -31);

By now, 32 map values are obtained, which are used to select row for 32 times. For instance, if map[1]=5, then select the $5^{th}$ row in private key calculating base or public key calculating base. If map[2]=21, then select the $21^{st}$ row, and so on.

Column Value Algorithm:

In order to avoid using column variables in sequence, set permutation algorithm (PMT) for column variables, and the result of column permutation is one kind of full permutation of (0, 1, 2, 3, . . . , 31). The algorithm is as follows.

Firstly, calculate the key PMT_KEY used in PMT algorithm:

$AES_{COLKEY}(IDENTITY)=PMT\_KEY$: COLKEY is given in ID certificate.

Then, using PMT_KEY as the key; and encrypting the original sequence with PMT algorithm, to obtain column permutation value PERMUT:

$PMT_{PMT\_KEY}$ (original sequence)=PERMUT: original sequence is the natural sequence of 0, 1, . . . 31. PERMUT is a new permuted sequence: $\sigma(0, 1, \ldots, 31)=t_0, t_1, t_2, \ldots, t_{31}$.

Suppose $t_0, t_1, t_2, \ldots, t_{31}=(3, 6, 12, \ldots, 5)$, then select column variable according to new sequence of 31, 6, 12, . . . , 5.

For instance, after the above row value calculation and column value calculation, the row values of 32 rows are (7, 13, 29, . . . , 11), and the column permutation values are (3, 6, 12, . . . , 5). Thus, the variables selectively used in private key calculating base are s[7,3], s[13,6], s[29,12], ..., s[11,5]. The variables selectively used in public key calculating base are P[7,3], P[13,6], P[29, 12], ..., P[11,5]. Because during public key calculation and private key calculation, the mapping values are the same, and the positions selected are exactly the same, this ensures matching between public key and private key.

(3) Function-domain Parameters

To define function-domain is to solve the conflict between open and isolation in an authentication network, and is the key technology to perform logic isolation.

Suppose the authentication network is divided into n levels. For convenience, the authentication network is divided into three levels, i.e., the function-domain parameters are divided into province domain, city domain and county domain.

The province domain is a parameter that only works within the province. If there is no inter-connection requirement among different province domains, and each province domain is entirely independent, then independent calculating base is only needed, and no province domain parameter is required.

The city domain is a parameter that only works within the city. The parameters among different city domains are different.

The county domain is a parameter that only works within the county. The parameters among different county domains are different. This satisfies division requirement.

The province public key parameter ensures communication within the province domain, the city public key parameter ensures communication within the city domain, and the county public key parameter ensures communication within the county domain. This satisfies communication requirement.

(4) Calculation of Key Pair

Assume user A has an address abcde@yahoo.com on Internet, the size of calculating base is (32×32);

Suppose, the row value is:

$$MAP_0[I] \bmod 32 = map[i] \ (i=0, 1, \ldots, 15)$$

$$MAP_1[I] \bmod 32 = map[i] \ (i=16, 17, \ldots, 31);$$

The column value is:

$$PMT_{PMT\_KEY} \text{ (original sequence)} = t_0, t_1, t_2, \ldots, t_{31};$$

Then, the key management center (KMC) generates private key for user A with the following formula:

$$S_A = \left(\sum_{i=0}^{31} (s_{[[i],t[i]]}) + \text{function-domain parameter}\right) \bmod n;$$

Each party concerned calculates user A's public key with the following formula:

$$P_A = \left(\sum_{i=0}^{31} (P_{[[i],t[i]]}) + \text{function-domain parameter}\right);$$

Using Discrete Logarithm Cryptography to simulate calculation of public/private key of ECC is as follows:

The key management center (KMC) generates private key for user A with the following formula:

$$s_A = \left(\sum_{i=0}^{31} (s_{[[i],t[i]]}) + \text{function-domain parameter}\right) \bmod m;$$

Each party concerned calculates user A's public key with the following formula:

$$p_A = \left(\prod_{i=0}^{31} (P_{[[i],t[i]]} \times \text{function-domain parameter})\right);$$

Thus, it is formed a corresponding relation of public key and private key with email address as identity. Only the Key Management Center has the private key calculating base. Accordingly, generation of private key can only be done in the Key Management Center. In addition, because the public key calculating base is open, any party concerned can calculate the communicating party's public key, as long as he knows the communicating party's email address. Because calculation of public key is automatic, to users, the communicating party's user name (identity) acts as a public key.

(5) Storage of Public Key

Each user only keeps its own private key and public key calculating base, for digital signature and key exchange. Suppose: the size of public key calculating base is (f×h), then the storage capacity is (f×h), and the number of public keys is $(f)^h$. The table below compares the size of calculating base and the number of public keys. For example, when the matrix is (16×64)=1k, the storage capacity is 1k, and the number of public keys is $(16)^{64}=2^{256}=10^{77}$.

| m | h | Storage Capacity | Number of Keys |
|---|---|---|---|
| $32 = 2^5$ | $16 = 2^4$ | $2^9 = 512$ | $(2^5)^{16} = 2^{80} \approx 10^{24}$ |
| $64 = 2^6$ | $16 = 2^4$ | $2^{10} = 1k$ | $(2^6)^{16} = 2^{96} \approx 10^{28}$ |
| $32 = 2^5$ | $32 = 2^5$ | $2^{10} = 1k$ | $(2^5)^{32} = 2^{160} \approx 10^{48}$ |
| $64 = 2^6$ | $32 = 2^5$ | $2^{11} = 2k$ | $(2^6)^{32} = 2^{192} \approx 10^{57}$ |
| $16 = 2^4$ | $64 = 2^6$ | $2^{10} = 1k$ | $(2^4)^{64} = 2^{256} \approx 10^{77}$ |

Because the number of common parameters that need to be stored is rather limited, and the parameters are open variables, which can be stored in various convenient media or positions. For instance, the parameters can be directly written into personal ID certificate to distribute to each individual, or published on websites to share.

(6) ID Certificate

ID certificate consists of certificate proper and variables.

The certificate proper of the invention is similar to a typical certificate, which defines basic properties of the user, e.g., name, role, grade, expiration date, issuing authority, signature, and alike constant parts. The certificate proper satisfies distributable obligated security safety policy of classification.

The variables are the core of a certificate. They define the key and parameter variables, and including n different identities and n domains. The variables include the following 16 segments. The variables satisfy request voluntary assurance safety policy of classification.

| Verifying Parameters | |
| --- | --- |
| 1 Verifying Parameters | Z1: Verification parameter, Z2 Verification parameter |

| Role Identity Definition | |
| --- | --- |
| 2 User Role | Grade: Employee, Mid-level, Senior, Customer |
| 3 Identity Definition | Name, Unit, Address, phone Number, Position |
| 4 Account Definition | Account 1, Account 2, . . . |

| Domains | |
| --- | --- |
| 5 Keys for province domain | Common keys for province domain network, row value keys for province domain network, column value keys for province domain network |
| 6 Keys for city domain | Common keys for city domain network, row value keys for city domain network, column value keys for city domain network |
| 7 Keys for county domain | Common keys for county domain network, row value keys for county domain network, column value keys for county domain network |

| Private Key Variables | |
| --- | --- |
| 8 Private key variable for province domain network | Name, Unit, Address, Telephone, Position, Account 1, Account 2 . . . |
| 9 Private key variable for city domain network | Name, Unit, Address, Telephone, Position, Account 1, Account 2 . . . |
| 10 Private key variable for county domain network | Name, Unit, Address, Telephone, Position, Account 1, Account 2 . . . |

| Public Key Variables | |
| --- | --- |
| 11 Public key variable for province domain network | Name, Unit, Address, Telephone, Position, Account 1, Account 2 . . . |
| 12 Public key variable for city domain network | Name, Unit, Address, Telephone, Position, Account 1, Account 2 . . . |
| 13 Public key variable for county domain network | Name, Unit, Address, Telephone, Position, Account 1, Account 2 . . . |

| Issuing Certificate | |
| --- | --- |
| 14 Issuing certificate | Issuing organization, Signature of the issuing organization |

The above items are main components of the variables. However, the public key calculating base and spare keys can be added into the variables.

| Public Key Calculating base | |
| --- | --- |
| 15 Public key calculating base | Public key calculating base |

| Spare Keys | |
| --- | --- |
| 16 Spare Keys | Spare public key 1, Spare public key 2, two-way Key |

Hence, there are three forms of certificate as follows:
Form 1: ID certificate=certificate proper+variables;
Form 2: ID certificate=certificate proper+variables+public key calculating base;
Form 3: ID certificate=certificate proper+variables+Spare keys.

(7) Example of Implementing System

Based on the invention, a trusted authentication system can be constructed, including business authentication system, telephone and email authentication system, note authentication system, and agent (process) authentication system. The system generally is classified into three categories: background program, client program, and the standard part.

The background program is the program of key management center. The key management center is the highest organization of management. Under corresponding security policy, it mainly undertakes offline generating task. Private-key generation needs private key calculating base. According to the user identity provided by the user (telephone, email address, personal account), it generates corresponding private keys, which are recorded in the media under protection of user password, and are distributed to users in the form of ID certificate. The media can be IC card.

The core of client program is stored in IC card, which includes IC card operating system that contains signature and authentication functions, public key calculation program, and ID certificate. Thus, in the IC card, both public key calculating base used as common parameter and public key calculation program are recorded at the same time. The KMC produces and issues IC cards that contain IC card operating system with signature and authentication functions, public key calculation program, and ID certificate with various contents.

Because key management is a very complicated systems engineering, the system adaptability of the program and flexibility of the certificate are critical. There are several authentication networks, such as single-layered authentication network, multi-layered authentication network, star authentication network, grid authentication network. To adapt to various authentication network, the ID certificate format shall be same, but the contents of the certificate can be different.

The agent (process) verification technology can only be achieved by software, which mainly protects private keys.

The present invention can be implemented by software, hardware or combination of software and hardware. The method of the present invention can be presented in several program commands, which can implement the method when executed by one or more processors, so as to achieve the objects of the present invention.

Although the above-mentioned embodiments use elliptic curve cryptography and discrete logarithm cryptography as example, and combine some specific key generating procedure, to generate public key from identity and a few common parameters, people skilled in the art will understand that, based on the disclosure of the present invention, one can use other cryptography mechanism that can be obtained currently or developed in the future, to generate public key from identity and a few common parameters. Thus, the scope of the present invention is not limited in the specific cryptography form and generating mechanism disclosed herein, it also includes other possible cryptography form and generating mechanism.

We claim:

1. A device for generating an asymmetrical key pair based on a user identity, including:
    at least one processor and memory positioned in a key management center, the processor configured for generating a private key calculation parameter and a public key calculation parameter corresponding to each other, storing the private key calculation parameter in the memory, calculating a first user's private key based on an identity provided by the first user, providing the calculated private key to the first user by writing into a media, and publishing the public key calculation parameter, so that a second user can calculate a public key of the first user based on the published public key calculation parameter and the first user's identity by running the public key calculation program stored in a media, in which when calculating the public key and private key, besides the public key calculation parameter and private key calculation parameter, a domain parameter with a layered structure is implemented, in which:

elliptic curve cryptography or discrete logarithm cryptography is used by the processor when generating the public key calculation parameter and the private key calculation parameter;

the public key calculation parameter and private key calculation parameter each is in the form of a matrix; and when calculating the public key/private key, the identity being transformed, and one or more elements in the public/private key calculation parameter matrix being oriented, are combined by the processor to obtain the public/private key.

2. The device of claim 1, in which the first user and the second user are same user or different users.

* * * * *